United States Patent [19]
Grünbauer et al.

[11] Patent Number: 6,162,862
[45] Date of Patent: Dec. 19, 2000

[54] POLYFUNCTIONAL LIQUID URETHANE COMPOSITION

[75] Inventors: Henri J.M. Grünbauer, Oostburg; Camiel F. Bartelink, Terneuzen; Michael J. Elwell, IJzendijke, all of Netherlands; Martin Möller, Ulm, Germany

[73] Assignee: The Dow Chemical Company, Midland, Mich.

[21] Appl. No.: 09/391,132

[22] Filed: Sep. 7, 1999

Related U.S. Application Data

[63] Continuation of application No. 08/742,546, Nov. 1, 1996, abandoned.

[51] Int. Cl.[7] .............................. C08J 3/00; C08K 3/20; C08L 75/00; C08L 83/00; C08G 77/04
[52] U.S. Cl. .................. 524/590; 427/372.2; 427/385.5; 428/423.1; 524/588; 524/838; 528/28; 528/44; 528/65; 528/59; 528/85
[58] Field of Search ..................... 524/590, 588, 524/838; 528/28, 44, 65, 59, 85; 427/372.2, 385.5; 428/423.1

[56] References Cited

U.S. PATENT DOCUMENTS

| | | | |
|---|---|---|---|
| 4,079,028 | 3/1978 | Emmons et al. | 260/29.6 |
| 4,129,455 | 12/1978 | Thompson et al. | 106/308 |
| 4,163,749 | 8/1979 | Hauxwell et al. | 260/404.5 |
| 4,246,391 | 1/1981 | Watson, Jr. | 528/49 |
| 5,071,951 | 12/1991 | Ulrich et al. | 528/111 |
| 5,136,009 | 8/1992 | Meixner et al. | 528/49 |
| 5,236,960 | 8/1993 | Harrison et al. | 521/51 |
| 5,281,654 | 1/1994 | Eisenhart et al. | 524/500 |

FOREIGN PATENT DOCUMENTS

| | | |
|---|---|---|
| 1270046 | 6/1968 | Germany . |
| 4101239 | 4/1992 | Germany . |
| 1182365 | 2/1970 | United Kingdom . |
| 2139239 | 11/1984 | United Kingdom . |

OTHER PUBLICATIONS

Abstract of DE 4101239.
Abstract of GB 1117494 (equivalent to DE 1270046).

*Primary Examiner*—Patrick D. Niland

[57] ABSTRACT

Disclosed is a urethane-based composition of value in surface coating applications, including treatment of glass or textiles, in adhesives and in the manufacture of a stabilized latex. The composition comprises a polyfunctional liquid urethane-containing adduct wherein said adduct contains as a first functional group at least one isocyanate moiety per molecule, and a second functional group per molecule which is not an isocyanate moiety and which is not reactive towards isocyanate functionality. The second functional group can comprise ester, nitrile, halogen, halocarbon, siloxyl, silyl, alkyne or alkene, or combinations of two or more thereof.

20 Claims, No Drawings

POLYFUNCTIONAL LIQUID URETHANE COMPOSITION

This application is a continuation of U.S. Ser. No. 08/742,546 filed Nov. 1, 1996 now abandoned.

BACKGROUND OF INVENTION

This invention relates to a polyfunctional liquid urethane-containing composition. More specifically this invention relates to a composition comprising an adduct which contains a plurality of internal urethane linkages, has isocyanate functionality, and additional, different, functional group(s) that under normal conditions are not susceptible to entering into reaction with isocyanate functionality.

In general, urethane-containing adducts are prepared by reacting an organic polyisocyanate with an active hydrogen-containing substance. The reaction may be conducted in the presence of a solvent and various addition sequences of isocyanate with active hydrogen-containing substances employed so as to arrive at an end product that can be substantially free of any isocyanate functionality or isocyanate-reactive functionality such as disclosed in U.S. Pat. No. 4,079,028. The products disclosed are essentially non-reactive products having value as a rheology modifying agent in various application areas including paint compositions and cosmetics. However it is noted that the procedure of preparing adducts as reported in U.S. Pat. No. 4,079,028 is deficient with respect to control of molecular weight build-up leading to undesirable gelation or solids formation. Liquid adducts are generally favored for convenience of industrial processes.

There is now a desire to modify such adducts and provide alternative molecules that are "tailored" to perform multiple tasks whereby their rheological characteristics can be exploited in other application areas, including surface protection and adhesives. By surface protection, it is understood the protection of a surface by coating that surface with a protective substance. By adhesive, it is understood the bonding of a first surface to a second surface that can be of a like or different substrate. In conventional surface coating chemistry and adhesion technology, frequently many different molecules are used in sequence or in combination to achieve the desired end result. Accordingly, it would be attractive to provide an alternative molecule which can reduce, or even overcome, the need to use multiple molecules.

The present investigation has been directed to overcoming the process deficiencies associated with U.S. Pat. No. 4,079,028 and at the same time to providing a "tailored" reactive molecule having value in surface coating and adhesive application areas. From our investigations, it is now found that such adducts can be prepared via a solvent free process with careful control of the reactants, presence of processing aids, and process conditions. By the term "processing aids", it is meant substances which act as catalyst to reactions involving the isocyanate functionality and especially substances which promote the formation of the urethane linkage.

SUMMARY OF THE INVENTION

In a first aspect, this invention relates to a liquid urethane-based composition which comprises a polyfunctional liquid urethane-containing adduct wherein said adduct contains as a first functional group at least one isocyanate moiety per molecule, and at least one second functional group per molecule which is not an isocyanate and which is not reactive towards isocyanate.

In a second aspect, this invention relates to a process for preparing a polyfunctional liquid urethane-containing composition, as mentioned above, by a solvent-free two-step process which comprises reacting in a first step a polyisocyanate with a polyahl to provide an isocyanate-terminated intermediate, and in a second step reacting the said intermediate with a polyfunctional substance wherein:

a) the polyisocyanate comprises at least two isocyanate moieties per molecule with a different reactivity to the polyahl;

b) the polyahl is an organic substance having a molecular weight of from about 60 to about 20,000 and containing per molecule from two or more isocyanate-reactive functional groups selected from the group consisting of —OH, —SH, —COOH, —NHR where R is hydrogen or alkyl, or epoxy; and c) the polyfunctional substance is a molecule containing one isocyanate-reactive functional group selected from the group consisting of —OH, —SH, —COOH, —NHR where R is hydrogen or alkyl, or epoxy and further containing a second functional group which is not an isocyanate or an isocyanate-reactive moiety, characterized in that:

i) for the first step, conducted in essentially anhydrous conditions and in the absence of a urethane-promoting catalyst, the polyahl is added at a controlled rate to the polyisocyanate such that the reaction temperature does not exceed 100° C. and the total amount of polyahl added is less than a stoichiometric equivalent with respect to the polyisocyanate; and ii) for the second step, the polyfunctional substance is added in a total amount of less than a stoichiometric equivalent with respect to the isocyanate content of the intermediate.

In a third aspect, this invention relates to a surface coating procedure which comprises bringing into contact with a substrate a composition as mentioned above.

In a fourth aspect, this invention relates to a method of preparing a stabilized latex which comprises preparing the latex in the presence of a composition as mentioned above.

In a fifth aspect, this invention relates to a method for preparing a cured polymer resin which comprises subjecting a polymer resin or precursor thereof to a curing means in the presence of a composition as mentioned above.

DETAILED DESCRIPTION OF THE INVENTION

The composition of this invention is characterized in that it comprises a polyfunctional liquid urethane adduct bearing isocyanate functional group and a second different functional group, which under normal conditions does not react with the isocyanate moiety. By the term "liquid" it is meant that the adduct is a liquid at a temperature of 50° C. or less, and preferably is a liquid at a temperature of from about 0° C. to about 50° C. The composition advantageously comprises the adduct in an amount of from about 1 to about 99, preferably from about 5 to about 95, more preferably from about 10 to about 90, and yet more preferably from about 50 to about 90 weight percent, based on total parts by weight of the composition. Further, the composition is characterized in that it has an isocyanate content of from about 0.01 to 15, preferably from about 0.1 to 12, more preferably from about 0.2 to about 10, weight percent. Advantageously, when intended for use in adhesive or coating applications, the composition may have an isocyanate content of from about 0.1 to about 5, preferably from about 0.2 to about 3, weight percent.

The polyfunctional liquid urethane-containing adduct has a radial-like structure comprising at least two or more radii or arms, per molecule. At least one radius, or arm, bears an isocyanate functional group; and at least one radius bears a second, different, functional group which under normal conditions does not react with the isocyanate moiety. In a preferred embodiment of this invention, the adduct has on average of from about 2 to about 8, more preferably from about 3 to about 8, and yet more preferably from greater than 3 to about 6 radii per molecule, wherein each radius contains one or more urethane linkages. When the adduct contains from 2 to 8 radii per molecule; then from 1 to 7 isocyanate moieties per molecule and from 7 to 1 second functional moieties are present. The optimum ratio of isocyanate moiety to second functional moiety will depend on the intended end use of the composition and can vary within the ranges of from about 1:7 to 7:1, or preferably from about 1:2 to about 2:1.

The second functional moiety of the adduct is any functional group other than isocyanate and which does not enter into direct reaction with the isocyanate functionality. In a preferred embodiment the second functional group is itself a reactive moiety which can participate in chemical reactions other than that leading to the formation of urethane. Exemplary of such second functional groups include aryl, alkyl, ester, nitrile, alkene, alkyne, siloxane, siloxyl, silyl, halogen, halocarbon, or combinations of two or more thereof. By the term "halocarbon", it is meant especially fluoroalkyl, fluoroalkenyl or fluoroalkynyl moieties although the other halogen analogues can also be present. Presently preferred second functional groups include nitrile, alkene, halocarbon, siloxyl and silyl moieties.

The composition of this invention, and the adduct, is prepared by a solvent-free two-step process which comprises a first step wherein a polyisocyanate is reacted, in the absence of a urethane-promoting catalyst, with a polyahl containing isocyanate-reactive groups to provide an isocyanate-terminated intermediate; and subsequently in a second step, reacting the isocyanate-terminated intermediate with a polyfunctional capping substance to provide the end product. Following is a more detailed description of reactants and processing parameters.

The polyisocyanate

The polyisocyanate used in the process to prepare the adduct product has at least two isocyanate moieties per molecule and which, with respect to the isocyanate-reactive group of the polyahl, are distinguished by a difference in reactivity. The reactivity difference optimizes the manufacture of a product having a narrow molecular weight distribution and reduces the potential for formation of higher oligomers leading to gel-like or non-liquid products. When the polyisocyanate contains three or more isocyanate groups per molecule then the relative reactivity of the individual isocyanate moieties is such to minimize formation of higher oligomers. Suitable polyisocyanates can be aliphatic or preferably aromatic polyisocyanates and especially aromatic or aliphatic diisocyanates. An advantage to using diisocyanates, where the relative reactivity of the individual isocyanate groups are different, is that it permits the amounts of free, non-reacted, polyisocyanate that may be present in the isocyanate-terminated intermediate to be limited to the subsequent advantage of material requirements for the second process step, and further to the value of the adduct in end applications. Exemplary of suitable aromatic polyisocyanates include toluene diisocyanate, methylene diphenylisocyanate and polymethylene polyphenylisocyanates. Exemplary of suitable aliphatic polyisocyanates include isophorone diisocyanate, isopropylcyclohexyl diisocyanate and methylene dicyclohexylisocyanate. Preferred are polyisocyanates comprising isomers of toluene diisocyanate, of methylene diphenylisocyanate or mixtures thereof. Especially preferred, for reasons of relative isocyanate reactivity, is 2,4'-methylene diphenylisocyanate and notably 2,4-toluene diisocyanate, or mixtures comprising such diisocyanate.

The polyahl

The polyahl used in the process comprises two or more isocyanate-reactive functional groups per molecule where such functional groups include —OH, —SH, —COOH, —NHR, with R being hydrogen or an alkyl moiety, or epoxy. Preferred is a polyahl bearing —OH functionality, namely a polyol. The polyahl may contain up to about 8 such functional groups per molecule, preferably from about 2 to about 8, more preferably from about 3 to about 8, and most preferably from greater than 3 to about 6, functional groups per molecule.

The polyahl used in the process of this invention has a molecular weight of from about 60 to about 20,000; preferably from about 200, more preferably from about 1000, and yet more preferably from about 2000; and preferably up to about 15,000, and more preferably up to about 10,000. In a preferred embodiment the polyahl is a polyester or particularly a polyoxyalkylene polyol where the oxyalkylene entity comprises oxyethylene, oxypropylene, oxybutylene or mixtures of two or more thereof, including especially oxypropylene-oxyethylene mixtures. Alternative polyols that may be used in the invention include polyalkylene carbonate-based polyols and polyphosphate-based polyols. The nature of the polyol selected depends on whether or not to impart some water solubility to the adduct, which can be advantageous for certain applications and disadvantageous for other applications. Water solubility can be enhanced by selection of polyols having a lower molecular weight or an elevated oxyethylene content.

Suitable polyoxyalkylene polyols are exemplified by various commercially available polyols as used in polyurethane, lubricant, surfactancy applications and include polyoxypropylene glycols designated as VORANOL™ P-2000 and P-4000 with respectively molecular weights of 2000 and 4000; polyoxypropylene-oxyethylene glycols such as DOWFAX™ DM-30 understood to have a molecular weight of about 600 and an oxyethylene content of about 65 weight percent, and SYNALOX™ 25D-700 understood to have a molecular weight of about 5500 and an oxyethylene content of about 65 weight percent, all available from The Dow Chemical Company; polyoxyethylene triols available under the trademark TERRALOX™ and designated as product WG-98 and WG-116 understood to have a molecular weight of about 700 and about 980, respectively, polyoxypropylene-oxyethylene triols designated as VORANOL™ CP 1000 and CP 3055 understood to have respectively a molecular weight of about 1000 and about 3000, and VORANOL™ CP 3001 understood to have a molecular weight of about 3000 and an oxyethylene content of about 10 weight percent and VORANOL™ CP 6001 understood to have a molecular weight of about 6000 and an oxyethylene content of about 15 weight percent, all available from The Dow Chemical Company; polyoxypropylene hexols including VORANOL™ RN-482 understood to have a molecular weight of about 700, and polyoxyethylene hexols including TERRALOX™ HP-400 understood to have a molecular weight of about 975, both available from The Dow Chemical Company; higher functionality polyether polyols including those based on carbohydrate initiators such as, for example, sucrose and exemplified by VORANOL™ 370 available from The Dow Chemical Company.

The Polyfunctional "capping" Substance

The polyfunctional "capping" substance is preferably an organic substance containing one isocyanate-reactive functional group per molecule such as —OH, —SH, —COOH, —NHR where R is hydrogen or alkyl, or epoxy and further containing a second functional group. Preferred is a substance having as the isocyanate-reactive functionality a hydroxyl group. The second functional group of the capping substance is any functionality other than isocyanate and which does not enter into direct reaction with the isocyanate functionality. In a preferred embodiment, the second functional group is itself a reactive moiety which can participate in chemical reactions other than that leading to the formation of urethane. Exemplary of such second functional groups include aryl, alkyl, ester, nitrile, alkene, alkyne, siloxane, siloxyl, silyl, halogen, halocarbon, or combinations of two or more thereof provided that such combination is not intrareactive. By the term "halocarbon", it is meant especially fluoroalkyl, fluoroalkenyl or fluoroalkynyl moieties, although the other halogen analogues can also be present. Preferred second functional groups include nitrile, alkene, halocarbon, siloxyl and silyl moieties. Exemplary of substances suitable for use as the polyfunctional "capping" agent include 2-hydroxyalkylacrylates or 2-hydroxyalkylmethacrylates where the alkyl substituent has from 1 to 6 carbon atoms such as, for example, 2-hydroxyethylmethacrylate; alkyl esters of $\alpha,\omega$-hydroxyacids such as, for example, 1-hydroxymethyl acetate; alkyl esters of $\alpha,\omega$-aminoacids such as, for example, the methyl ester of aminoethanoic acid; alkyl alcohols with a linear or branched alkyl residue; aryl alcohols; alkene alcohols such as, for example, hex-1-ene-6-ol or vinyl phenol; siloxanes such as, for example, trimethylsiloxyhydroxyethoxypropyl polydimethylsiloxane, hydroxyalkyl halides or haloalkyl acids such as, for example, 1H,1H,2H, 2H-perfluorooctan-1-ol, heptafluorobutyric acid and perfluorooctanoic acid. The above listing of polyfunctional substances is by no means exhaustive; the selection of alternative substances meeting the requisite functionality/reactivity requirements for use as the polyfunctional capping agent is well within the skills of a person knowledgeable in the art of organic chemistry.

The polyfunctional "capping" substance is chosen with consideration to the intended end application of the products resulting from the process. When it is desired to influence, for example, the water miscibility of the adducts, an appropriate substance with a hydrophilic or hydrophobic backbone is selected.

In a preferred embodiment of this invention the polyisocyanate is toluene diisocyanate comprising, substantially, the 2,4-isomer; the polyahl is a polyoxyalkylene polyol, especially a polyoxyethylene-oxypropylene polyol containing from 3 to 6 hydroxyl groups; and the polyfunctional "capping" substance is a 2-hydroxyalkylacrylate, 2-hydroxyalkylmethacrylate, alkene alcohol, siloxane, hydroxyalkyl halide or a haloalkyl acid.

The Process

As mentioned, the method of preparing the urethane-containing adduct comprises a first and a second process step, optionally between the first and second step is an intermediate step.

The first step concerns the preparation of an isocyanate-terminated intermediate by reacting the polyisocyanate with the polyahl at a reaction temperature that does not exceed 100° C., in essentially anhydrous conditions. By "essentially anhydrous conditions" it is meant that water is present in an amount of less than about 1500, preferably less than about 750, more preferably less than about 350 ppm of total polyisocyanate and polyahl reactants. The presence of water in an amount greater than this increases the risk of forming gel or solid products. The reaction temperature advantageously is from about 20° C., more preferably from about 35° C.; and preferably up to about 80° C., more preferably up to about 70° C. At higher reaction temperatures, the beneficial effect of the relative isocyanate reactivity rates can be substantially diminished, and additionally isocyanate may be consumed by an undesirable allophonate reaction. The polyahl is added at a controlled rate to the polyisocyanate such that the reaction temperature does not exceed 100° C., and the total amount of polyahl added is a stoichiometric equivalent or less with respect to the polyisocyanate. The total amount of polyahl advantageously does not exceed about 0.99, preferably does not exceed about 0.95 of an equivalent; and advantageously is at least 0.1, preferably at least 0.25, and more preferably from about 0.5 of an equivalent per equivalent of isocyanate.

As already mentioned, the first process step is conducted in essentially anhydrous conditions and in the absence of a processing aid. By the term "processing aid" in the context of this invention, it is meant substances that promote the formation of urethane linkage by reaction of isocyanate with an active hydrogen atom. To minimize potential gel formation, solidification, it is advantageous to use polyahls that do not contain any catalyst or catalyst finishing residues, for example, potassium acetate, which might promote urethane formation or isocyanate dimerization or trimerization. Additionally to minimize gel formation when preparing the intermediate it is advantageous to use polyahls, especially polyols, that have an acid content; such procedures when preparing isocyanate-terminated prepolymers are known from the general art.

When the resulting isocyanate-terminated intermediate has a high free, unreacted, isocyanate content, and before proceeding with the second step of the process it can be advantageous to reduce such content by, for example, distillation or extraction techniques using suitable solvents including pentane or hexane. Free, unreacted isocyanate can participate in the second process step providing capped products, the presence of which in the final product may be detrimental to performance in certain end applications.

In the second step of the process, the isocyanate-terminated intermediate is reacted with less than a stoichiometric amount of a polyfunctional "capping" substance to provide the final adduct. The stoichiometry is such to provide for the desired isocyanate content of the composition.

For the second step, the process temperature is chosen for convenience of reaction time and can be greater than 100° C. without noticeable detriment to the quality of the resulting adduct and its performance in end applications. In general, exposure to a temperature greater than 120° C. should be minimized for the purpose of avoiding undesirable side reactions including allophanate formation. The reaction of the isocyanate-terminated intermediate with the polyfunctional substance can, if desired, be accelerated by use of a suitable urethane-promoting catalyst. Representative of such catalysts include tertiary amine compounds and organotin compounds as used when preparing, for example, polyurethane foam by reaction of a polyisocyanate with a polyol. It is to be noted that use of a catalyst in the second step can lead to final adducts having a higher viscosity than those prepared in the absence of catalyst.

The above described two-step process is the presently preferred method of manufacturing the adduct as it provides the possibility of manufacturing a standard intermediate master batch that can then be reacted with various polyfunctional "capping" substances to provide adducts suited to different application areas. Other methods can be envisaged including, for example, first reacting the polyfunctional substance with an excess of polyisocyanate to provide an alternative isocyanate-terminated intermediate and subsequently reacting this with the polyahl. Other alternative methods can involve continuous, in contrast to batch, production procedures.

The composition and adduct disclosed herein has value in surface coating procedures that comprises bringing into contact with a substrate surface the composition or a formulation comprising the composition, for example, a paint formulation. The substrate can be glass, mineral, textiles, metals, natural or synthetic polymers and so forth. The composition also has value as a curing agent for polymer resins or precursors thereof, especially adhesives. Mixtures of a polymer resin, or precursor thereof, with the curing agent will become cured when exposed to a curing means such as for example heat, moisture or UV radiation. The appropriate curing means is selected on the basis of the desired chemistry in which the composition of the invention is to participate. Certain compositions of the invention, notably those containing alkene functionality, have value in the preparation of stabilized latex.

The invention is illustrated by the following examples in which all parts and percentages are by weight, unless otherwise stated.

EXAMPLE 1

A composition is prepared which comprises a polyfunctional urethane adduct bearing isocyanate functionality and fluoroalkyl functionality.

In the first step, toluene diisocyanate, 125.9 parts by weight, is introduced into a reaction vessel and brought to 50° C. under a nitrogen atmosphere. To the toluene isocyanate is added incrementally over a period of about 8 hours, and with stirring, 500 parts by weight of a glycerine-initiated poly(oxyethylene-oxypropylene) polyol having a hydroxyl equivalent weight of about 760 and with a 57:43 parts by weight ratio of oxyethylene to oxypropylene. The rate of addition is controlled so as to avoid temperature fluctuations of more than ±10° C. The resulting mixture is then retained at 50° C. and continuously stirred for an additional 12 hours before proceeding with a the second step of the preparation procedure.

In the second step, to the above resulting mixture is added in one portion with rapid stirring 95.8 parts by weight of 1H,1H,2H,2H-perfluorooctan-1-ol, available from Fluorochem Ltd., Glossop, Derbyshire, UK, in the presence of 0.3 parts by weight of dibutyltin dilaurate. The mixture is stirred for an additional 1 hour at 50° C. to bring the reaction to completion.

The so obtained composition is a liquid at 25° C. with an isocyanate content of 3.1 weight percent and comprises an estimated 98.2 weight percent of the adduct based on total weight of the composition.

EXAMPLE 2

A composition is prepared which comprises a polyfunctional urethane adduct bearing isocyanate functionality and siloxyl functionality.

In the first step, toluene diisocyanate, 99.7 parts by weight, is introduced into a reaction vessel and brought to 50° C. under a nitrogen atmosphere. To the toluene isocyanate is added incrementally over a period of about 8 hours, and with stirring, 500 parts by weight of a glycerine-initiated poly(oxyethylene-oxypropylene) polyol having a hydroxyl equivalent weight of about 960 and with a 57:43 parts by weight ratio of oxyethylene to oxypropylene. The rate of addition is controlled so as to avoid temperature fluctuations of more than ±10° C. The resulting mixture is then retained at 50° C. and continuously stirred for a further 12 hours before proceeding with a the second step of the preparation procedure.

In the second step, to the above resulting mixture is added in one portion with rapid stirring 208 parts by weight of trimethylsiloxy-hydroxyethoxypropyl polydimethylsiloxane, available from Fluorochem Ltd., Glossop, Derbyshire, UK, in the presence of 0.3 parts by weight of dibutyltin dilaurate. The mixture is stirred for an additional 1 hour at 50° C. to bring the reaction to completion.

The so obtained composition is a liquid at 25° C. with an isocyanate content of 2.2 weight percent and comprises an estimated 98.7 weight percent of the adduct based on total weight of the composition.

EXAMPLE 3

A composition is prepared which comprises a polyfunctional urethane adduct bearing isocyanate functionality and alkene functionality.

To 250 parts by weight of an isocyanate terminated intermediate mixture, obtained according to the first step of Example 1, at a temperature of about 50° C. under an inert atmosphere is added 26.8 parts by weight 2-hydroxyethylmethacrylate stabilized with p-benzoquinone (0.11 parts per hundred parts (pphp) of 2-hydroxylethylmethacrylate). The methacrylate is added at a rate of about 80 parts per hour and under conditions of continuous agitation. After complete addition of the 2-hydroxylethylmethacrylate, 0.26 parts of DABCO T-12, a proprietary tin-containing urethane catalyst is added and the total mixture then stirred for an additional 18 hours at 50° C. to bring the reaction to completion.

The so obtained composition is a liquid at 25° C. with an isocyanate content of 0.6 weight percent and exhibits a zero-shear rate viscosity at 23±1° C. of 138 Pa•s.

In contrast, an adduct similarly prepared in the presence of an increased amount of the 2-hydroxylethylmethacrylate, sufficient to consume all isocyanate-functional groups of the intermediate mixture, and in the presence of DABCO T-12 is observed to have a zero-shear rate viscosity at 23±1° C. of 240 Pa•s.

What is claimed is:

1. A liquid urethane-based composition which comprises a polyfunctional liquid urethane-containing adduct that is the reaction product of an isocyanate terminated intermediate with less than a stoichometric equivalent, with respect to the isocyanate content, of a polyfunctional substance wherein the intermediate is obtained by coupling a polyisocyanate with a polyahl wherein the polyahl has three to eight isocyanate functional groups per molecule and the polyfunctional substance is a molecule containing one isocyanate-reactive functional groups per molecule and a second functional group which is not an isocyanate or an isocyanate-reactive moiety.

2. The composition of claim 1 characterized in that it has an isocyanate content of from about 0.01 to about 15 weight percent.

3. The composition of claim 1 which comprises the adduct in an amount of from about 5 to about 95 weight percent, based on the total parts by weight of the composition.

4. The composition of claim 1 which comprises the adduct in an amount of from about 10 to about 90 weight percent.

5. The composition of claim 1 wherein the second functional group of the adduct comprises aryl, alkyl, ester, nitrile, alkene, alkyne, siloxane, siloxyl, silyl, halogen, halocarbon, or combinations of two or more thereof provided that such combination is not intrareactive.

6. The composition of claim 5 wherein the second functional group is nitrile, halocarbon, siloxyl, silyl, alkyne or alkene.

7. The composition of claim 1 wherein the adduct contains from 1 to 7 isocyanate moieties per molecule, and from 1 to 7 functional moieties per molecule which is an aryl, alkyl, ester, nitrile, alkene, alkyne, siloxane, siloxyl, silyl, halogen, halocarbon, or combinations of two or more thereof provided that such combination is not intrareactive.

8. The composition of claim 6 wherein the average ratio of the number of isocyanate moieties per molecule to the number of second functional moieties per molecule is from about 1:7 to about 7:1.

9. The composition of claim 8 wherein the average ratio is from about 1:2 to about 2:1.

10. A process for preparing a polyfunctional liquid urethane-containing composition, as claimed in claim 1, by a solvent-free two-step process that comprises reacting in a first step a polyisocyanate with a polyahl to provide an isocyanate-terminated intermediate, and in a second step reacting the said intermediate with a polyfunctional substance wherein:

a) the polyisocyanate comprises at least three isocyanate moieties per molecule with a different reactivity to the polyahl;

b) the polyahl is an organic substance having a molecular weight of from about 60 to about 20000 and containing per molecule from two or more isocyanate-reactive functional groups selected from the group consisting of —OH, —SH, —COOH, —NHR where R is hydrogen, alkyl or aryl, or epoxy; and c) the polyfunctional substance is a molecule containing one isocyanate-reactive functional group per molecule selected from the group consisting of —OH, —SH, —COOH, —NHR where R is hydrogen or alkyl, or epoxy and further containing a second functional group, which is not an isocyanate nor an isocyanate-reactive moiety, characterized in that:

i) for the first step, conducted in essentially anhydrous conditions and in the absence of a urethane-promoting catalyst, the polyahl is added at a controlled rate to the polyisocyanate such that the reaction temperature does not exceed 100° C. and the total amount of polyahl added is less than a stoichiometric equivalent with respect to the polyisocyanate; and ii) for the second step, the polyfunctional substance is added in a total amount of less than a stoichiometric equivalent with respect to the isocyanate content of the intermediate.

11. The process of claim 10 wherein the polyisocyanate is an aromatic or aliphatic diisocyanate.

12. The process of claim 11 wherein the polyisocyanate is an aromatic polyisocyanate and comprises 2,4-toluene diisocyanate or 2,4'-methylene diphenylisocyanate.

13. The process of claim 11 wherein the polyisocyanate is an aliphatic polyisocyanate and comprises isophorone diisocyanate, isopropylcyclohexyl diisocyanate or methylene dicyclohexylisocyanate.

14. The process of claim 10 wherein the polyahl has a number average molecular weight of from about 200 to about 10,000 and contains per molecule from about 2 to about 8 isocyanate-reactive groups.

15. The process of claim 14 wherein the polyahl is a polyoxyalkylene polyol.

16. The process of claim 10 wherein the second functional group of the polyfunctional substance is nitrile, halocarbon, siloxyl, silyl, alkyne or alkene.

17. A surface coating procedure which comprises bringing into contact with a substrate a composition as claimed in claim 1.

18. A method of preparing a stabilized latex which comprises preparing the latex in the presence of a composition as claimed in claim 1.

19. A method for preparing a cured polymer resin which comprises subjecting a polymer resin or precursor thereof to a curing means in the presence of a composition as claimed in claim 1.

20. A polyfunctional urethane-containing composition which is a liquid at 50° C., and which is obtainable by a solvent-free two-step process that comprises reacting in a first step a polyisocyanate with a polyahl to provide an isocyanate-terminated intermediate, and in a second step reacting the said intermediate with a polyfunctional substance wherein:

a) the polyisocyanate comprises at least two isocyanate moieties per molecule with a different reactivity to the polyahl;

b) the polyahl is an organic substance having a molecular weight of from about 60 to about 20000 and containing per molecule from two or more isocyanate-reactive functional groups selected from the group consisting of —OH, —SH, —COOH, —NHR where R is hydrogen, alkyl or aryl, or epoxy; and c) the polyfunctional substance is a molecule containing one isocyanate-reactive functional group per molecule selected from the group consisting of —OH, —SH, —COOH, —NHR where R is hydrogen or alkyl, or epoxy and further containing a second functional group, which is not an isocyanate nor an isocyanate-reactive moiety, characterized in that:

i) in the first step, conducted in essentially anhydrous conditions and in the absence of a urethane-promoting catalyst, the polyahl is added at a controlled rate to the polyisocyanate such that the reaction temperature does not exceed 100° C. and the total amount of polyahl added is less than a stoichiometric equivalent with respect to the polyisocyanate; and ii) for the second step, the polyfunctional substance is added in a total amount of less than a stoichiometric equivalent with respect to the isocyanate content of the intermediate.

* * * * *